United States Patent [19]

Da Pra'

[11] Patent Number: 5,146,649
[45] Date of Patent: Sep. 15, 1992

[54] RESILIENT HINGE DEVICE FOR SPECTACLES
[75] Inventor: Bortolo Da Pra', Cornuda, Italy
[73] Assignee: NEOFORM S.n.c. di Bortolo Da Pra' & C., Cornuda, Italy
[21] Appl. No.: 695,225
[22] Filed: May 3, 1991
[30] Foreign Application Priority Data May 10, 1990 [IT] Italy .................. 84951 A/90

[51] Int. Cl.$^5$ .................. G02C 5/22; G02C 5/14
[52] U.S. Cl. .................. 16/228; 351/153; 351/121
[58] Field of Search .......... 16/224, 228; 351/153, 351/113, 121

[56] References Cited
U.S. PATENT DOCUMENTS 2,630,569  3/1953  Baratelli et al. .............. 351/153
3,813,152  5/1974  Hampel .
5,009,495  4/1991  Williams .................. 16/228

FOREIGN PATENT DOCUMENTS 1009345  5/1952  France .................. 351/153
588580  2/1959  Italy .
612322  11/1960  Italy .
134731  9/1969  Italy .

Primary Examiner—John Sipos
Assistant Examiner—Carmine Cuda
Attorney, Agent, or Firm—Wegner, Cantor, Mueller & Player

[57] ABSTRACT

The hinge device according to the present invention is constituted by a first element provided with a guiding surface for the rotation about a predetermined axis of a second element which is provided with a surface movable about the axis and thus suitable for cooperating with the guiding surface.

According to an essential feature of the invention, at least the second element is further provided with a series of interconnected grooves which form respective housings for a resilient element which is positioned in the grooves; the resilient element, which is generally constituted by a leaf spring, and a portion of which is clamped on the first element or is integral therewith, forms the connecting member between the first and second elements, allowing to the latter a movement along the guiding surface, and imparting to both elements a resilient restoring force towards predetermined positions.

6 Claims, 1 Drawing Sheet

RESILIENT HINGE DEVICE FOR SPECTACLES

The present invention relates to a resilient hinge device.

More particularly, the present invention relates to a hinge device which is particularly suitable for connecting the arms of spectacles to the lens-carrying frame thereof, and allowing a resilient straddle of the arms, overcoming the normal opening position, relative to said frame.

Said hinge may be mainly applied in the field of optical industry.

BACKGROUND ART

Many devices are known in the art, which form a resilient hinge suitable for allowing a lens-carrying frame to be connected to the arms of spectacles.

Said devices allow, in operation, the arms to be bent towards a resting position, in which they are positioned and resiliently held substantially parallel to the frame; furthermore, they allow a straddling movement of each arm beyond the normal opening position, said straddling movement undergoing a resilient restoring force which urges the arm towards the normal opening position.

Devices of this kind are known, for instance, from document IT-A-588.580, in which a screw forming the rotation pivot of the hinge is encircled by a tubular spring which exerts the restoring function; furthermore, document IT-A-612.322 discloses a device in which the rotation pivot is constituted by a small prismatic block of the arm, and the resilient restoring movement is carried out by means of a leaf spring acting against said small prismatic block; Italian utility model IT-U-134.731 describes a spectacles hinge in which an element consituting the pivot, assembled on the frame, is connected to an element having a cam surface carried by the arm, and in which the frame is provided with a dead hole inside of which acts, under the action exerted by a compression spring, a cam follower formed by a metallic cylinder having a rounded tip which cooperates with the cam surface. This last form of embodiment, according to which the cam follower may have various shapes, for instance the shape of a sphere made of a metallic or self-lubricating material, is commonly used in the most of modern resilient hinges for spectacles.

The devices known in the art provide for a plurality of drawbacks and disadvantages, since they comprise a plurality of elements suitable for assuring the functionality of the hinge, such as screws, which need corresponding female threads in the connecting elements, spiral springs, cam followers and so on; the presence of these elements raises, thus, the costs and the working time necessary for producin the hinges, taking also account of the required working precision.

DESCRIPTION OF THE INVENTION

It is the main purpose of the present invention that of obviating to the drawbacks and disadvantages typical of the background art and to provide, therefore, for a resilient or flexible hinge device, advantageously but not exclusively a hinge for spectacles, in which the number of component parts is reduced to an absolutely necessary minimum and which would allow, thus, the costs and the working time involved for its production to be reduced in a substantial way.

This is achieved by a device having the features disclosed in the main claim.

The dependent claims describe advantageous forms of embodiment of the invention.

The hinge device according to the present invention is constituted by a first element provided with a guiding surface for the rotation about a predetermined axis of a second element which is provided with a surface movable about said axis and thus suitable for cooperating with said guiding surface.

According to an essential feature of the invention, at least said second element is further provided with a series of interconnected grooves which form respective housings for a resilient element which is positioned in said grooves; said resilient element, which is generally constituted by a leaf spring, and a portion of which is clamped on said first element or is integral therewith, forms the connecting member between said first and second elements, allowing to the latter a movement along the guiding surface, and imparting to both elements a resilient restoring force towards predetermined positions.

ILLUSTRATION OF THE DRAWINGS

Other advantages and features of the invention will become apparent from reading the following description, of a form of embodiment of the invention, given as a non-limiting example, with the help of the figures shown in the attached drawing in which.

DESCRIPTION OF A PREFERRED FORM OF EMBODIMENT

Figure 1:
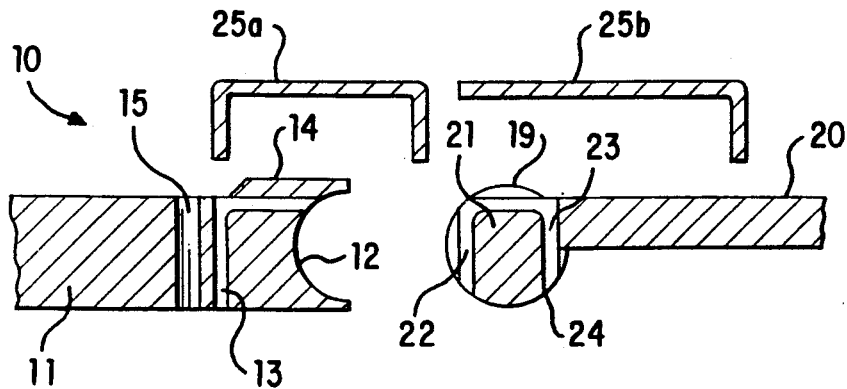
FIG. 1 shows a side section of the hinge device according to the present invention.
Figure 2:
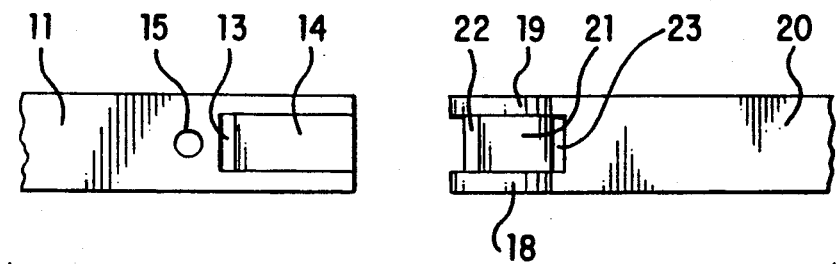
FIG. 2 shows a plant view of the device of FIG. 1.
Figure 3:
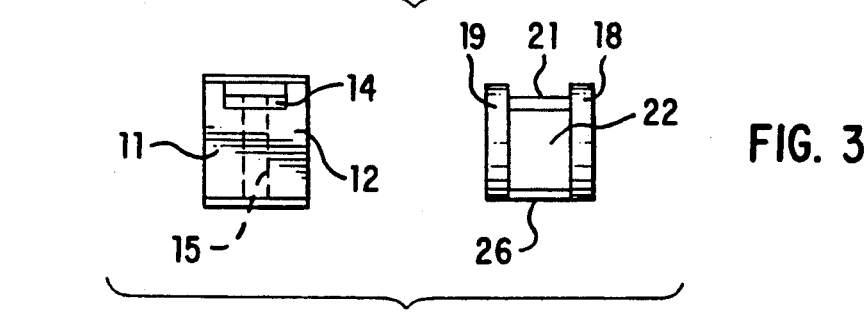
FIG. 3 shows a front view of the two component parts of the hinge according to the invention.

In the figures, reference sign 10 generally indicates a hinge device, advantageously a hinge for spectacles, according to the present invention.

The device 10 comprises a first, generally metallic or synthetic, elongated element 11 which is provided, in correspondence of one end thereof, with a semicircular notch 12 defining a rotation surface about an axis passing in the center of the virtual circle defined by a side section of said notch.

Said first element 11 comprises, according to a form of embodiment, a first rectilinear groove 13 disposed in a generally perpendicular position relative to the longitudinal axis of element 11, and a second rectilinear groove 14 disposed parallel to said longitudinal axis and extending outwards, by one end, in correspondence of said first groove 13 and, by its other end, in correspondence of said notch 12.

Figure 4:
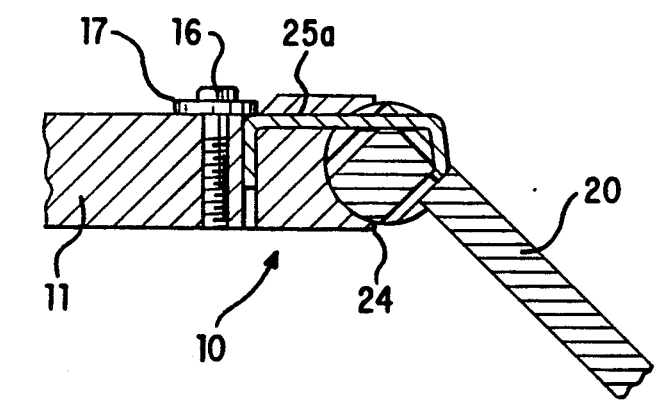
FIG. 4 shows, in a side section, a working position of the device according to the invention.

Finally, said first element 11 is provided with a threaded hole 15, which is suitable for cooperating in operation, according to this first form of embodiment of the invention, with a screw 16 cooperating with a clamping washer 17 (see FIG. 4).

Said notch 12, shaped as a circular sector is suitable for housing, in operation, a pair of circular-sector-shaped extensions 18, 19, which are disposed at one end of a second, generally metallic, elongated element 20.

Furthermore, said second element 20 comprises, respectively, a third (21), a fourth (22) and a fifth (23) grooves disposed between said extensions 18, 19:

said third (21) groove is disposed parallel to the longitudinal axis of element 20;

said fouth (22) and fifth (23) grooves are disposed perpendicular to the longitudinal axis of element 20 and are connected, by one end thereof, to said third groove 21.

As it may be easily noted in FIGS. 1 and 4, said grooves belonging to, respectively, said first (11) and second (20) metallic elements form, in operation, a single guide for housing a third element 25a which is the connecting member between said two elements 11, 20 and which is constituted, according to this form of embodiment, by a metallic U-shaped flat spring in which one of the arms is permanently housed inside of said first groove 13 of the first element 11.

In operation, the base of the U-shaped spring is housed in a guide which is respectively formed by groove 14 of the first element 11 and, according to the rotation position of element 20 relative to element 11, by one of the grooves located in correspondence of one end of element 20, while the other arm of the U-shaped spring is housed in another groove of element 20.

By way of example, referring to FIG. 1, when elements 11, 20 are joined and the longitudinal axes thereof are aligned to each other, one arm of the U-shaped spring 25a is housed in groove 13, the base is housed in the guide formed by the respective grooves 14 and 21, and the other arm is housed in groove 24.

Such a position, in which spring 24 substantially mantains its original and natural shape, is stable and represents, for instance, the open position of the arms relative to the lens-carrying frame of spectacles.

Clearly, other positions disposed at a 90° angle relative to the position described above, are also stable, since spring 25a does not undergo any effort, and it simply carries out the function of holding elements 11 and 20 joined in correspondence of notch 12.

A different situation may be faced in the case of a rotation movement, for instance, of element 20 about the rotation axis passing through the center of the circle defined by notch 12; this movement will be hereinafter described with reference to the two main rotations which may be effectuated by means of a hinge of this kind.

I) As it may be noted in FIG. 4, a clockwise rotation of element 20 relative to element 11 involves an effort exerted by the edges (which are generally round-shaped) of the bottom of groove 21 upon the base and upon an arm of spring 25. Therefore, spring 25 is bent in at least two points and, thanks to its resiliency, it exerts on element 20 an effort which, for an imparted rotation by an angle smaller than 45°, brings element 20 back to its original position and which, for an imparted rotation greater than 45°, adds up to the effort imparted to element 20 with the aim of quickly attaining a stable balanced position disposed at 90° relative to the starting position.

Rotations having an amplitude greater than 90° are not allowed, since the body of element 20 abuts against one end 24 of element 11 in correspondence of notch 12.

II) A counterclockwise rotation of element 20, relative to element 11, is also possible: in this case, spring 25 is bent by the edge comprised between groove 21 and groove 23 or by tooth 26, which acts against the end of said spring 25. Spring 25 exerts here a great effort for bringing element 20 back to its stable balance position.

As it may be easily deduced from an examination of the possible rotations of element 20 relative to element 11, the hinge device 10 according to the present invention may be mainly applied as a hinge for spectacles.

In this case, element 11 is connected, for instance, to the lens-carrying frame, and this through suitable means which are not part of the present invention, while element 20 is connected to an arm or bar.

Thus, considering the position shown in FIG. 1 as the normal open position of spectacles, the movements I and II described above represent, respectively, a spectacles closing action and a spectacles opening action which overcomes the normal opening point and which has the purpose, by way of example, of correctly positioning the spectacles on one's face.

The invention has been previously described with reference to a preferred form of embodiment.

However, it comprises several variants which fall within its scope.

Thus, the invention englobes forms of embodiment according to which element 11, which forms the rotation surface, is connected to the arm and element 20, which is the rotatable body, is connected to the lens-carrying frame of spectacles.

Furthermore, in the form of embodiment described above, connecting element 25a is constituted by a metallic flat spring.

However, neither the section shape, nor the constitutive material of spring 25 represent a limitation of the extent of the invention: according to other forms of embodiment the spring may for instance be constituted by a circular spring.

Furthermore, in the form of embodiment described above, one arm of the spring is fixed in groove 13 of element 11 by means of a washer 17 connected to a screw 16 which is, on its turn, fixed to element 11.

There are obviously many alternatives for fixing the spring arm to groove 13 such as, for instance, welding, or embedding means, or any other mechanical fixing means which may be figured by a skilled man.

According to a further form of embodiment of the invention, said first element 11 is neither provided with grooves, nor with through holes, and spring 25b (see FIG. 1) is simply fixed on it by the most suitable means or it is integral with element 11.

Furthermore, the elements 11, 20 described above may either be separately applied to the objects (spectacles, cases, etc.) thus, respectively, by way of example, to the lens-carrying frame and to the arms of spectacles, or may be produced integral with each object by means of, for instance, a casting process.

In any case, the thereby obtained hinge is devoid of screw joints, which are typical of the background art hinges, and the mechanical joint between the two constitutive elements is merely carried out by means of the resilient element 25.

I claim:

1. Resilient or flexible hinge device (10) for spectacles, comprising a first element (11) provided with a rotation axis for a second element (20) rotatable about said axis, and means (25) for joining said first (11) and second (20) elements, characterised in that said first element (11) is constituted by a synthetic or metallic elongated element which is provided, at one end thereof, with a notch (12) having a section shaped as a circular sector defining a rotation surface, in that said second element (20) is constituted by synthetic or metallic elongated element which is provided, at one end thereof, with a pair of extensions (18, 19) having a section substantially shaped as a circular sector and forming a rotatable body which is movable on said rotation surface about the rotation axis defined by said notch (12), in that said second element (20) further comprises, in correspondence of said end, a groove (21) parallel to the longitudinal axis of said second element (20) and two other grooves (22, 23) perpendicular to said longitudinal axis, and in that said first element (11) and said respective grooves (21, 22, 23) are suitable for housing, in operation, said joining means (25).

2. Device (10) according to claim 1, characterised in that said means (25) are constituted by a metallic or synthetic resilient element, a portion of said metallic or synthetic resilient element being permanently fixed to, or integral with, said first element (11).

3. Device according to claim 2, characterised in that said metallic or synthetic resilient element (25) has a section with a substantially rectangular shape.

4. Device according to claim 2, characterised in that said metallic or synthetic resilient element (25) has a substantially circular section.

5. Device according to claim 1, characterised in that said first element (11) has a first groove (13) which is disposed substantially perpendicular to the longitudinal axis of said first element (11) and another groove (14) which is disposed substantially parallel to said longitudinal axis and which extends, by one end thereof, into said notch (12) and, by the other end thereof, into said first groove (13), a portion of said joining means (25) being inserted and fixed in said first groove (13), another portion of said joining means (25) being housed in said another groove (14).

6. Device according to claim 1, characterised in that, during a 90° rotation movement imparted to said second element (20) about said rotation axis, said movement starting from a stable balance position, said element (20) undergoes, through said joining means (25), a force which, for a rotation smaller than 45° counteracts the action of the imparted movement and, for a rotation greater than 45°, reinforces said action.

* * * * *